March 20, 1928.
A. E. ROE
1,663,062
CAN CAP SOLDERING APPARATUS
Filed March 28, 1927    2 Sheets-Sheet 1
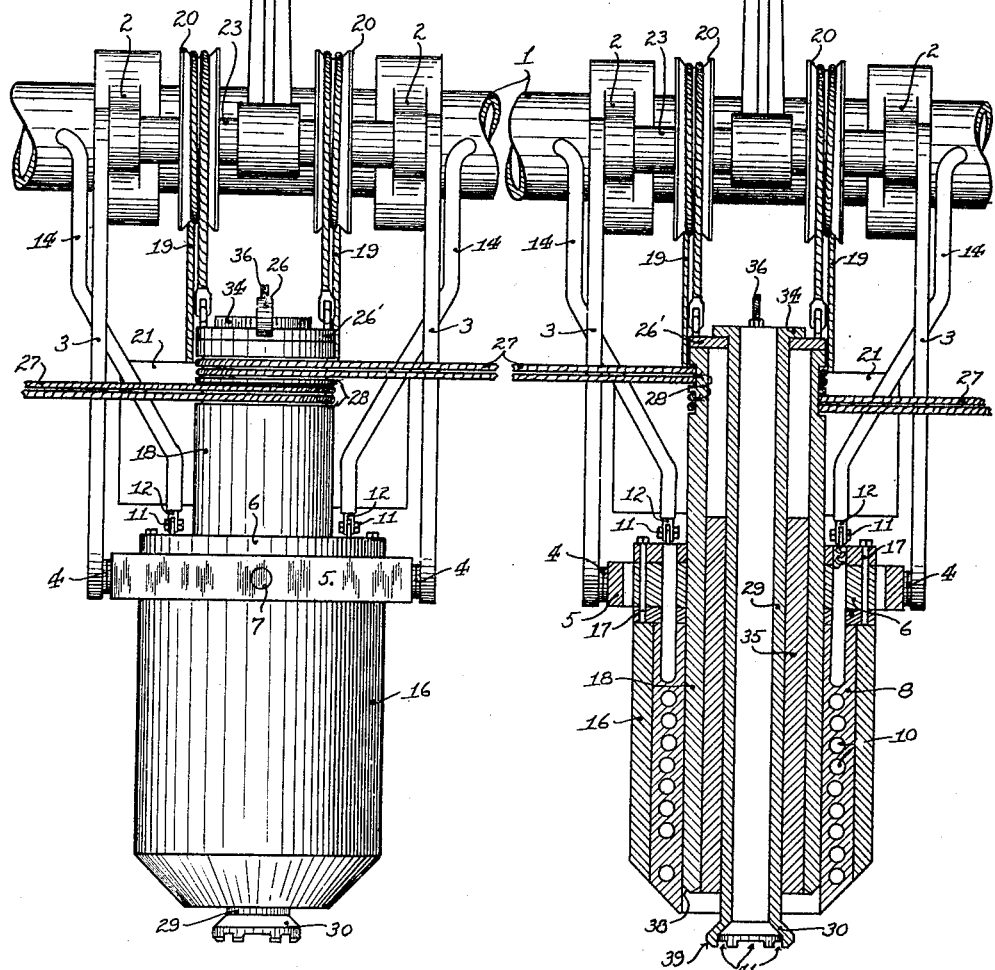
INVENTOR.
Alpheus E. Roe
BY Booth & Booth
ATTORNEYS March 20, 1928.
A. E. ROE
1,663,062
CAN CAP SOLDERING APPARATUS
Filed March 28, 1927
2 Sheets-Sheet 2
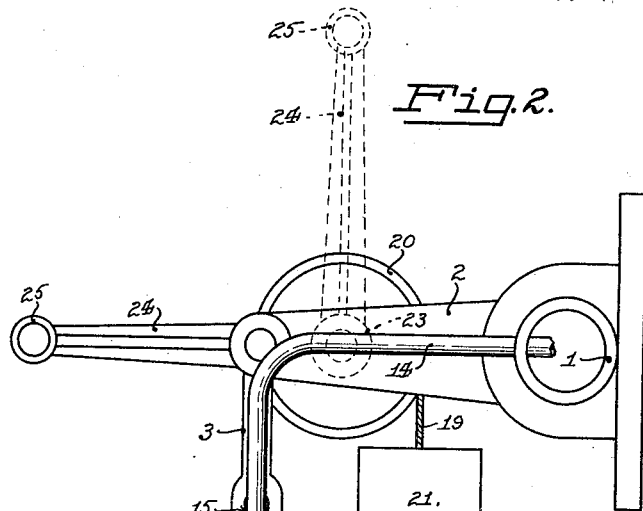
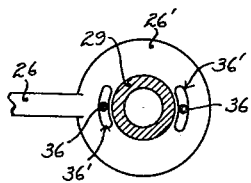
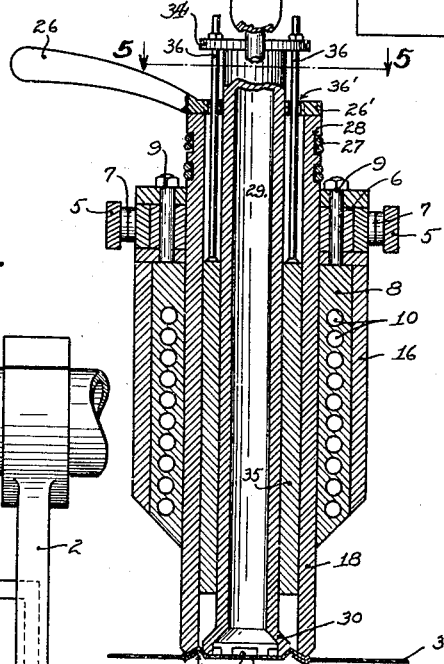
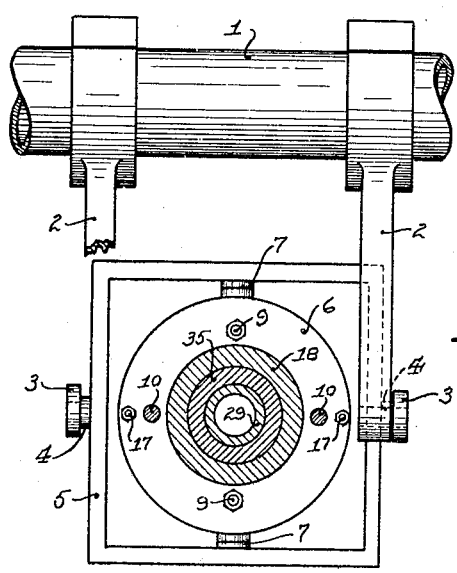
INVENTOR.
Alpheus E. Roe
BY Booth & Booth
ATTORNEYS.

Patented Mar. 20, 1928.

1,663,062

UNITED STATES PATENT OFFICE.

ALPHEUS E. ROE, OF OAKLAND, CALIFORNIA.

CAN-CAP-SOLDERING APPARATUS.

Application filed March 28, 1927. Serial No. 178,888.

My invention relates to machines for sealing cans by soldering caps over the filling openings thereof.

The principal object of the invention is to provide a machine capable of operating simultaneously upon a plurality of cans, and which will perform the operation in the least possible time.

Other objects are to provide efficient heaters for the soldering irons, to provide for quick and accurate positioning of the irons upon the work, and to provide means for rapidly cooling the soldered joints and to hold the caps securely in position during such cooling. These and other objects and advantages of the invention will be set forth more fully in the following description of a preferred form of the machine, with the understanding that the form, proportion, and arrangement of the several parts may be varied, within the limits of the claims hereto appended, without departing from the spirit of the invention as set forth in said claims.

My invention contemplates the use of a plurality of simultaneously operated similar units, each unit constituting a complete mechanism for soldering a cap upon a positioned can. It is intended that each can, before being positioned in operative relation to the machine, shall have a cap loosely placed over its filling aperture, and that the solder, in proper form, shall also be applied before the cans are positioned. I prefer to use caps whose peripheral edges have previously been coated with solder by any suitable process, but it will readily be understood that the solder may be applied in other ways, as for example by positioning a pre-formed ring of solder between the cap and the can top upon which it rests.

The cans, with the caps loosely applied over their filling apertures, and with the solder likewise properly applied, are positioned one beneath each unit of the machine. Each unit comprises a heating member, preferably electric, a cylindrical soldering member heated thereby, and a holding member. The latter two members are lowered into contact with the can cap, the soldering member contacting with the peripheral portion of the cap and melting the solder, and the holding member resting upon the center portion of the cap and holding it in position after the soldering member is again elevated, to permit the solder to cool and solidify. Means are also provided for oscillating the soldering member while in contact with the cap, to secure even melting of the solder, and for inducing a current of air to pass over the cap to expedite the cooling of the solder.

My invention permits the use of iron soldering members, which are considerably less costly than copper, and are less subject to deterioration. It also permits great savings both in time and labor, and in the quantity of solder used. Although the machine is adapted for use upon any type of cans having soldered caps, it is particularly suitable for capping cans containing gasoline or other volatile and inflammable liquids, not only because the soldering members or irons can be heated electrically, but also because the time required to complete the soldering operation is so short that there is no disadvantageous or dangerous heating of the contents of the cans.

A preferred embodiment of my invention will now be described fully with reference to the accompanying drawings, wherein:—

Fig. 1 is a front view, partly in elevation and partly in section, showing two units of the mechanism in inoperative position.

Fig. 2 is a side view partly in section, of one unit in operative position.

Fig. 3 is an enlarged sectional detail of the lower portion of one unit in operative position.

Fig. 4 is a horizontal view of one unit, partly in plan and partly in section, certain parts being omitted for the sake of clearness.

Fig. 5 is a horizontal sectional detail taken on the line 5—5 of Fig. 2.

In the drawings, the reference numeral 1 designates a horizontal tubular supporting member, extending the entire length of the machine, by which the several units are supported. Laterally extending rigid brackets 2 are fixed to said support 1 and project forwardly therefrom. These brackets are arranged in pairs, each pair supporting one unit of the machine. All such units being identical, a description of one will suffice for all.

From the outer ends of the brackets 2 are suspended links 3, whose lower ends are pivotally connected at 4 with a horizontally disposed trunnion frame or ring 5. This frame is shown as square, but its shape is immaterial. A second trunnion frame 6, positioned within the outer frame 5, is pivotally connected therewith at 7, the latter pivots being located 90 degrees away from the pivots 4 of the outer frame 5, as shown in Fig. 4. Thus the inner frame 6 and the parts supported thereby can swing freely in any direction, for a purpose to be described later.

A tubular heating member 8 is rigidly secured by bolts 9, Fig. 2, to the inner trunnion frame 6, and hangs downwardly therefrom. This heating member is preferably made of cast iron or other suitable metal, and has a properly insulated electric resistance heating coil 10 embedded in it. The ends of said coil extend upwardly through the trunnion frame 6, and are connected at 11, Fig. 1, with conductors 12 which are led into and through the main supporting tube 1 to a suitable source of electric current, not shown. The conductors 12 are, of course, properly insulated, and are preferably encased in suitable flexible conduits 14 between the tube 1 and the heating member 8, so that they are well protected. As a further means of protection for said conductors, I prefer to lead the conduits 14 through slots 15, Fig. 2, in the links 3. The heating member 8 is surrounded by a jacket 16 of suitable heat-insulating material, suspended from the trunnion frame 6 by bolts 17, Fig. 1.

A tubular soldering member 18, preferably made of iron, is positioned within the heating member 8, and is capable of both vertical sliding movement and horizontal oscillation therein. This tubular soldering iron extends above the heating member 8 and the trunnion frame 6, and is entirely supported by a pair of cables 19, which pass around drums 20 and are connected with a counterweight 21. The drums 20 are secured upon a horizontal rotatable spindle 23 extending between the fixed brackets 2. An arm 24 is secured to the spindle 23 and projects therefrom, and the outer ends of the arms of all the units are connected together by a horizontal bar 25, common to all said arms, by which they may be raised or lowered simultaneously to rotate the drums 20 and raise or lower the soldering irons 18.

At least one of the soldering irons 18 is provided with a handle 26, Figs. 2 and 5, extending forwardly from a cap member 26' secured to the upper end of said iron, by which it may be oscillated within the heating member 8, the flexibility of the suspending cables 19 permitting such oscillation to a limited extent. The irons 18 of all the units are caused to oscillate in unison by flexible belts 27, Fig. 1, preferably in the form of wire cables, which pass around grooves 28 formed near the upper ends of the irons and connect them together as shown.

Within the soldering iron 18 of each unit is a tubular plunger 29 having at its lower end a foot 30 adapted to rest upon the can cap 31 and hold it in position over the filling aperture 32 in the top of the can 33, as shown in Figs. 2 and 3. The upper end of said plunger is provided with a flange 34, which rests upon the top of the iron 18 when said iron is in its elevated position, as shown in Fig. 1. A tubular heat-insulating member 35 is interposed between the iron 18 and the plunger 29, and is suspended by rods 36, Fig. 2, from the flange 34. The plunger 29 and the insulating sleeve 35 are adapted to slide freely within the iron 18, and said iron is adapted to oscillate about said insulating sleeve, without oscillating the plunger 29, the rods 36 passing through suitably formed arcuate slots 36', Fig. 5, in the cap member 26'.

In using the machine, a can 33 is placed beneath each unit, by any means not shown, with its cap 31 in vertical alignment with the holder or pressure foot 30 and the soldering iron 18. It is to be understood that the cap 31 has first been properly treated to coat its peripheral portion or flange 37, Fig. 3, with solder, in a manner well known in the art, and has been placed in position over the can filling aperture 32 by hand or by any suitable means, not shown.

Assuming, then, that the cans have been properly positioned beneath the units, the bar 25 is moved forwardly and downwardly from the dotted line position of Fig. 2 to the full line position. This action first lowers the presser foot 30 upon the cap 31, and then the iron 18 continues to descend until its lower end rests upon the flange 37 of said cap. The lower end of said iron is properly formed to fit closely upon said flange 37. In the particular form of cap illustrated, the peripheral flange 37 is downwardly inclined, and the bottom face 38 of the iron 18 is inclined correspondingly, as best shown in Fig. 3. Similarly, the outer bottom corner of the foot 30 is beveled, as shown at 39, to fit the inclined rim 40 surrounding the center portion of the cap.

The beveled faces 38 and 39 of the iron 18 and plunger foot 30 serve properly to center the device upon the cap, the pivotal mountings 4 and 7 of the trunnion frames 5 and 6 permitting the heating member 8 to swing in any direction sufficiently to insure such centering of the foot 30 and iron 18, and also to insure an even contact of the latter with the entire circumference of the cap flange 37. The weight of the heating member 8 is sufficient to cause it to hang vertically and steadily, preventing undue swinging when the foot 30 and iron 18 are raised out of contact with the cap 31.

As soon as the irons 18 have been lowered into contact with the cap flanges 37 by operation of the bar 25, they are given a few oscillations, extending through about 45 degrees of arc, by means of the handle 26. This oscillation insures even heating and melting of the solder coating upon the cap flanges, producing perfect joints between said flanges and the can tops. The bar 25 is then raised part way, lifting the irons 18 off the caps, but leaving the plungers 29 with their feet 30 bearing upon said caps. The bar 25 is held in this position for a few seconds, the weight of the plungers 29 holding the caps 31 securely in position until the solder solidifies, and resisting the tendency of any gas which may have formed inside the cans to lift said caps while the solder is still molten.

The plunger 29 is hollow, as described, and its foot 30 is provided with notches 41 to permit a current of air to pass beneath said foot and up through the central bore of the plunger. This current of cool air, induced by the rising heated air within the bore of the plunger, passes directly over the upper surface of the cap 31, and rapidly cools and solidifies the solder.

Finally, when the solder has solidified, the bar 25 is raised to its upper limit, the caps 26' of the irons 18 contacting with the flanges 34 of the plungers 29, and lifting said plungers and their feet 30 off the caps 31. The sealed cans are then removed, by any suitable means, not shown, a new series of cans, with their caps positioned but not soldered, are placed beneath the units, and the operation is repeated. The entire operation of soldering and cooling need not require more than ten seconds.

I claim:—

1. A can-cap soldering apparatus comprising a heating member; a soldering member within said heating member; connections for flexibly suspending said soldering member independently of said heating member; means for raising and lowering said connections to move said soldering member to and from the work; a holder member fitted within the soldering member for linear movement to and from the work; and means associated with said members for effecting their movement with relation to the work, in reversed timely order.

2. A can-cap soldering apparatus comprising a heating member; a soldering member within said heating member; connections for flexibly suspending said soldering member independently of said heating member; means for raising and lowering said connections to move said soldering member to and from the work; a holder member fitted within the soldering member for linear movement to and from the work; means associated with said members for effecting their movement with relation to the work, in reversed timely order; and means for independently oscillating said soldering member.

3. A can-cap soldering apparatus comprising a heating member; means for suspending said heating member for universal angular adjustment; a soldering member fitted within said heating member for linear and rotative movement therein; connections for flexibly suspending said soldering member independently of said heating member; means for raising and lowering said connections to move said soldering member to and from the work; a holder member fitted within the soldering member for linear movement to and from the work; and means associated with said members for effecting their movement with relation to the work, in reversed timely order.

4. A can-cap soldering apparatus comprising a heating member; means for suspending said heating member for universal angular adjustment; a soldering member fitted within said heating member for linear and rotative movement therein; connections for flexibly suspending said soldering member independently of said heating member; means for raising and lowering said connections to move said soldering member to and from the work; a holder member fitted within the soldering member for linear movement to and from the work; means associated with said members for effecting their movement with relation to the work, in reversed timely order; and means for independently oscillating said soldering member.

5. A can-cap soldering apparatus comprising a heating member; an interpivoted double frame in which said heating member is pivotally mounted for universal angular adjustment; a soldering member fitted within said heating member for linear and rotative movement therein; connections for flexibly suspending said soldering member independently of said heating member; means for raising and lowering said connections to move said soldering member to and from the work; a holder member fitted within the soldering member for linear movement to and from the work; means associated with said members for effecting their movement with relation to the work, in reversed timely order; and means for independently oscillating said soldering member.

6. A can-cap soldering apparatus comprising a pair of brackets; links depending therefrom; a frame pivoted in said links; a second frame pivoted in said first frame for movement at right angles to the movement of the first frame; a heating member carried by said second frame; a soldering member fitted within said heating member for linear and rotative movement therein; a rock shaft; pulleys on said shaft; flexible lines passing over the pulleys and connected at one end to the soldering member; counterweights connected at the other end of said lines; a handle for oscillating said soldering member; a holder member fitted within the soldering member for linear movement; and contacting devices between said soldering and said holder members adapted to effect their movement with relation to the work, in reversed timely order.

In testimony whereof I have signed my name to this specification.

ALPHEUS E. ROE.